US008682151B2

(12) United States Patent
Minamisawa et al.

(10) Patent No.: US 8,682,151 B2
(45) Date of Patent: Mar. 25, 2014

(54) OPTICAL UNIT WITH SHAKE CORRECTING FUNCTION

(75) Inventors: Shinji Minamisawa, Nagano (JP); Yoshihiro Hamada, Nagano (JP); Katsushige Yanagisawa, Nagano (JP); Shinroku Asakawa, Nagano (JP); Hisahiro Ishihara, Nagano (JP); Tadashi Takeda, Nagano (JP); Kiyoshi Miyazaki, Nagano (JP)

(73) Assignee: Nidec Sankyo Corporation (JP)

( * ) Notice: Subject to any disclaimer, the term of this patent is extended or adjusted under 35 U.S.C. 154(b) by 105 days.

(21) Appl. No.: 13/395,945

(22) PCT Filed: Sep. 10, 2010

(86) PCT No.: PCT/JP2010/065603
§ 371 (c)(1), (2), (4) Date: May 23, 2012

(87) PCT Pub. No.: WO2011/037027
PCT Pub. Date: Mar. 31, 2011

(65) Prior Publication Data

US 2012/0224840 A1 Sep. 6, 2012

(30) Foreign Application Priority Data

Sep. 24, 2009 (JP) ................................ 2009-219572

(51) Int. Cl.
*G03B 17/00* (2006.01)

(52) U.S. Cl.
USPC ........................................................... 396/55

(58) Field of Classification Search
USPC ........................................................... 396/55
See application file for complete search history.

(56) References Cited

U.S. PATENT DOCUMENTS

2007/0109412 A1* 5/2007 Hara .......................... 348/207.1
2008/0085108 A1* 4/2008 Sekino et al. .................. 396/55
2010/0080545 A1* 4/2010 Fan et al. ........................ 396/55
2011/0122267 A1* 5/2011 Ahn et al. ................. 348/208.7

FOREIGN PATENT DOCUMENTS

JP 2002-165127 A 6/2002
JP 2006-166202 A 6/2006
JP 2006-178045 A 7/2006
JP 2007-58089 A 3/2007
JP 2007-102050 A 4/2007
JP 2008-83331 A 4/2008
JP 2009-128851 A 6/2009

OTHER PUBLICATIONS

International Search Report for International Application No. PCT/JP2010/065603, mailed Oct. 26, 2010, with English translation.

* cited by examiner

*Primary Examiner* — Clayton E Laballe
*Assistant Examiner* — Dennis Hancock
(74) *Attorney, Agent, or Firm* — Cantor Colburn LLP

(57) ABSTRACT

Disclosed is an optical unit with a shake correction function which is capable of suppressing interference with swinging of a movable module due to the rigidity of a wiring material and a repelling force generated when the wiring material is deformed, even when the wiring material is extended from the movable module. The optical unit uses a flexible wiring board as the wiring material for electrically interconnecting the movable module and outside. In the flexible wiring board, the connecting portion of a movable-side connecting section and an extending unit is provided, in the optical axis direction, on a side where the swing center of the movable module is positioned with respect to the position of the center of supporting a spring member to the movable module. The swing center, the connecting portion, and a fixed-side connecting section are at the same position in the optical axis direction.

17 Claims, 9 Drawing Sheets

OPTICAL UNIT WITH SHAKE CORRECTING FUNCTION

CROSS REFERENCE TO RELATED APPLICATIONS

This is a U.S. national stage of application No. PCT/JP2010/065603, filed on Sep. 10, 2010. Priority under 35 U.S.C. §119(a) and 35 U.S.C. §365(b) is claimed from Japanese Application No. 2009-219572, filed Sep. 24, 2009, the disclosure of which is also incorporated herein by reference.

TECHNICAL FIELD

The present invention relates to an optical unit with a shake correcting function which is mounted on a cell phone with a camera or the like.

BACKGROUND ART

An optical unit for photographing which is mounted on a cell phone or the like includes a movable body provided with a lens, a lens drive mechanism for magnetically driving the movable body in an optical axis direction, and a photographing unit in which an imaging element is supported on a support body. In the optical unit for photographing, it is preferable to restrain disturbance of a photographed image due to a hand shake of a user. Therefore, in a digital camera or the like, a technique has been proposed that a movable module provided with a photographing unit is swung by an actuator to correct a shake of the hand (see, for example, Patent Literatures 1 and 2).

Further, in Patent Literatures 1 and 2, in order that the rigidity of a cable extended from the movable module and a repulsive force when the cable has been bent do not disturb the swing of the movable module, a structure in which a cable is bent is adopted, or a structure is adopted in which the extended directions of a plurality of cables are different from each other.

[PTL 1] Japanese Patent Laid-Open No. 2006-166202

[PTL 2] Japanese Patent Laid-Open No. 2006-178045

However, the rigidity of a cable itself is large and its repulsive force when it has been bent is large and thus, like the structures described in Patent Literatures 1 and 2, even when a structure in which a cable is partially bent is adopted or, even when a structure in which extended directions of a plurality of cables are different from each other is adopted, the swing of the movable module is disturbed by the cable.

SUMMARY

In view of the problem described above, at least an embodiment of the present invention provides an optical unit with a shake correcting function in which a wiring member is restrained from obstructing swing of the movable module due to the rigidity of the wiring member and a repulsive force generated when the wiring member has been deformed even when the wiring member is extended from the movable module.

In order to attain the above, at least an embodiment of the present invention provides an optical unit with a shake correcting function including a fixed body, a movable module which holds an optical element, a spring member which supports the movable module so as to be capable of displacing with respect to the fixed body, a movable module drive mechanism for shake correction for swinging the movable module with respect to the fixed body, and a flexible circuit board which is connected with the movable module, the flexible circuit board including a movable side connecting part connected with the movable module and an extended part extended from the movable side connecting part. A connecting portion of the movable side connecting part with the extended part is located on a side where a swing center of the movable module is located in an optical axis direction of the optical element with respect to a support center position of the spring member for the movable module.

According to at least an embodiment of the present invention, a flexible circuit board is used as a wiring member which electrically connects the movable module with the outer side and the rigidity of the flexible circuit board is low in comparison with a cable and its repulsive force (shape returning force) when deformed is small. Therefore, the wiring member is restrained from disturbing the swing of the movable module. Further, in the flexible circuit board, the connecting portion of the movable side connecting part with the extended part is disposed on the side where the swing center of the movable module is located with respect to the support center position of the spring member for the movable module. Therefore, when the movable module is swung, a displacement amount of the flexible circuit board is small. Accordingly, even when the wiring member (flexible circuit board) is extended from the movable module, the rigidity of the wiring member and the repulsive force generated when the wiring member has been deformed are prevented from disturbing the swing of the movable module.

In at least an embodiment of the present invention, a structure may be adopted in which the flexible circuit board is provided with a fixed side connecting part which is connected with the fixed body on an opposite side to a side where the movable side connecting part is located with respect to the extended part. According to this structure, the flexible circuit board is easily fixed. Further, even when the flexible circuit board is connected with the fixed body, the connecting portion of the movable side connecting part with the extended part is disposed on the side where the swing center of the movable module is located with respect to the support center position of the spring member for the movable module and thus the rigidity of the wiring member and the repulsive force generated when the wiring member has been deformed are prevented from disturbing the swing of the movable module.

In at least an embodiment of the present invention, it is preferable that the swing center is set at a position less than ±0.5 mm in the optical axis direction from at least one of the connecting portion and the fixed side connecting part. According to this structure, a displacement amount of the flexible circuit board when the movable module is swung is small. Therefore, even when the wiring member (flexible circuit board) is extended from the movable module, the rigidity of the wiring member and the repulsive force generated when the wiring member has been deformed are prevented from disturbing the swing of the movable module.

In at least an embodiment of the present invention, it is preferable that the swing center, the connecting portion and the fixed side connecting part are located at the same position as each other in the optical axis direction. According to this structure, a displacement amount of the flexible circuit board when the movable module is swung is further small. Therefore, even when the wiring member (flexible circuit board) is extended from the movable module, the rigidity of the wiring member and the repulsive force generated when the wiring member has been deformed are prevented from disturbing the swing of the movable module.

In at least an embodiment of the present invention, it is preferable that a thickness direction of the extended part is directed in the optical axis direction. According to this structure, the rigidity when the movable module is swung and the flexible circuit board is displaced becomes small. Therefore, the rigidity of the wiring member and the repulsive force generated when the wiring member has been deformed are prevented from disturbing the swing of the movable module.

In at least an embodiment of the present invention, it is preferable that the extended part of the flexible circuit board includes a first extended part which is extended along a first side face of the movable module, and a second extended part which is extended along a second side face located on an opposite side to the first side face of the movable module across an optical axis of the optical element. According to this structure, the flexible circuit board follows the swing of the movable module to be smoothly deformed.

In at least an embodiment of the present invention, it is preferable that the extended part includes a first direction extended part extended in a first direction which is perpendicular to the optical axis direction, and a second direction extended part extended from the first direction extended part in a second direction which is perpendicular to the first direction extended part and the optical axis direction. According to this structure, the flexible circuit board follows the swing of the movable module to be smoothly deformed.

In at least an embodiment of the present invention, the spring member is comprised of one plate-shaped spring member, and the support center position is a connecting position of the plate-shaped spring member with the movable module.

In at least an embodiment of the present invention, the spring member is comprised of a first plate-shaped spring member and a second plate-shaped spring member which is disposed at a position separated from the first plate-like member in the optical axis direction and, in this case, the support center position is an intermediate position in the optical axis direction between a connecting position of the first plate-like member with the movable module and a connecting position of the second plate-like member with the movable module.

In at least an embodiment of the present invention, a flexible circuit board is used as a wiring member which electrically connects the movable module with the outer side and the rigidity of the flexible circuit board is low in comparison with a cable and its repulsive force (shape returning force) when having been deformed is small. Therefore, the wiring member is restrained from disturbing the swing of the movable module. Further, in the flexible circuit board, the connecting portion of the movable side connecting part with the extended part is disposed on the side where the swing center of the movable module is located with respect to the support center position of the spring member for the movable module and thus, the connecting portion is located in the vicinity of the swing center of the movable module. Therefore, when the movable module is swung, a displacement amount of the flexible circuit board is small. Accordingly, even when the wiring member (flexible circuit board) is extended from the movable module, the rigidity of the wiring member and the repulsive force generated when the wiring member has been deformed are prevented from disturbing the swing of the movable module.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is an explanatory view schematically showing a state in which an optical unit with a shake correcting function to which at least an embodiment of the present invention is applied is mounted on an optical device such as a cell phone or the like.

DETAILED DESCRIPTION

Embodiments of the present invention will be described below with reference to the accompanying drawings. In the following description, a structure for preventing a hand shake of a photographing unit will be described as an example as an optical element unit. Further, in the following description, three directions perpendicular to each other are set to be an "X"-axis, a "Y"-axis and a "Z"-axis and a direction along an optical axis "L" (lens optical axis) is set to be the "Z"-axis. Therefore, in the following description, regarding the swings of respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side in the "X"-axis, "−X" is indicated on the other side, "+Y" is indicated on one side in the "Y"-axis, "−Y" is indicated on the other side, "+Z" is indicated on one side (opposite side to an object side) in the "Z"-axis, and "−Z" is indicated on the other side (object side).

First Embodiment (Entire Structure of Optical Unit for Photographing)

Figure 1:
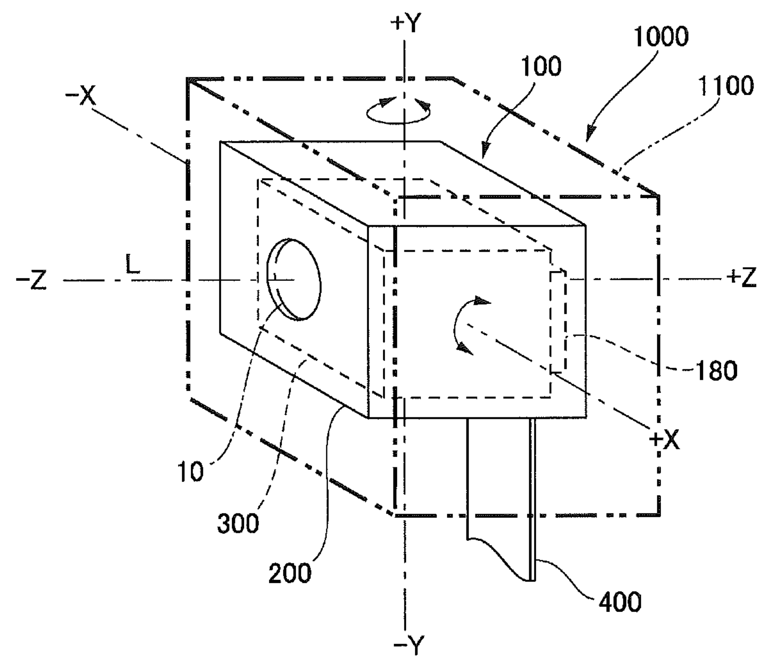

FIG. 1 is an explanatory view schematically showing a state in which an optical unit with a shake correcting function to which at least an embodiment of the present invention is applied is mounted on an optical device such as a cell phone or the like. An optical unit 100 (optical unit with a shake correcting function) shown in FIG. 1 is a thin camera used in an optical device 1000 such as a cell phone with a camera and is mounted in a supported state by a chassis 1110 of the optical device 1000 (device main body). In the optical unit 100, when a shake such as a hand shake is occurred in the optical device 1000 at the time of photographing, disturbance occurs in a photographed image. In order to prevent this problem, the optical unit 100 in this embodiment is, as described below with reference to FIGS. 3(*a*), 3(*b*) and 3(*c*), provided with a movable module drive mechanism (not shown in FIG. 1) which swingably supports a movable module 300 including a photographing unit 1 within a fixed body 200 and swings the movable module 300 on the basis of a detection result of a gyroscope 180 (angular velocity sensor) as a shake detection sensor. A flexible circuit board 400 is extended from the optical unit 100 for outputting a detection of the gyroscope 180 to a host control section and for performing energization to the movable module drive mechanism from the control section. Further, the flexible circuit board 400 is also electrically connected with the photographing unit 1. Therefore, the number of wiring lines in the flexible circuit board 400 is large. Accordingly, a width of the flexible circuit board 400 is required to be wide.

(Structure of Photographing Unit 1)

Figure 2:
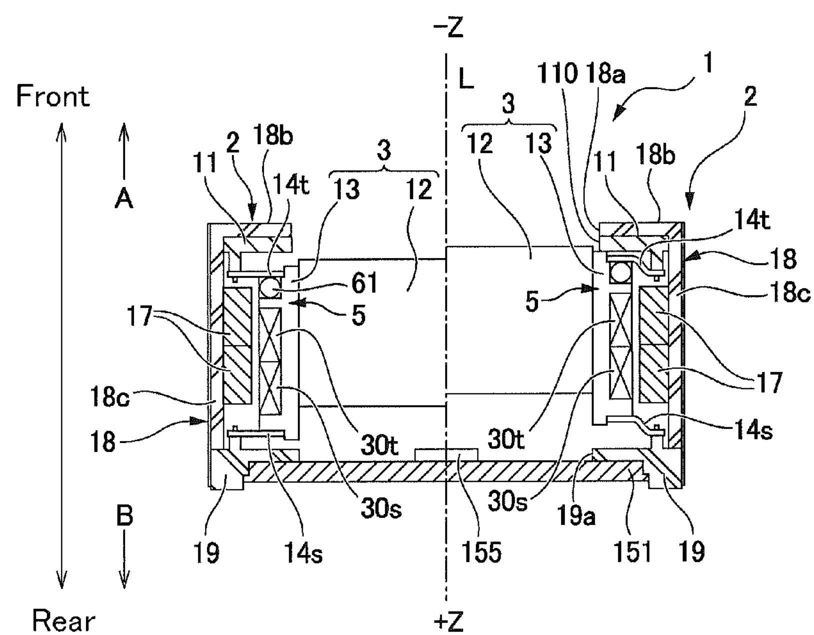
FIG. 2 is an explanatory view showing a photographing unit which is incorporated into a movable module of an optical unit with a shake correcting function to which at least an embodiment of the present invention is applied.

FIG. 2 is an explanatory view showing a photographing unit which is incorporated into a movable module of an optical unit with a shake correcting function to which at least an embodiment of the present invention is applied. As shown in FIG. 2, the photographing unit 1 is, for example, an optical element unit which moves a plurality of lenses 10 as an optical element (see FIG. 1) in both directions, i.e., in an "A"-direction (front side) approaching an object to be photographed (object side) along a direction of the optical axis "L", and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 10 and a fixed diaphragm in its inner side, a magnetic drive mechanism 5 for moving the movable body 3 along the optical axis direction "L", and a support body 2 on which the magnetic drive mechanism 5, the movable body 3 and the like are mounted. The movable body 3 is provided with a lens holder 12 in a cylindrical tube shape which holds the lenses and the fixed diaphragm and a coil holder 13 which holds the lens holder 12 in its inner side. Lens drive coils 30*s* and 30*t* structuring the lens drive mechanism 5 are held on an outer peripheral side face of the coil holder 13.

The support body 2 is provided with an imaging element holder 19 in a rectangular plate shape which positions an imaging element 155 on an opposite side to the object side ("−Z" side), a box-shaped case 18 which is placed on the object side of the imaging element holder 19, and a spacer 11 in a rectangular plate shape which is disposed on an inner side of the case 18. Circular incident windows 110 and 18*a* for taking light from the object to be photographed to the lens are respectively formed at centers of the case 18 and the spacer 11. Further, a window 19*a* for guiding incident light to the imaging element 155 is formed at a center of the imaging element holder 19. In the photographing unit 1, the support body 2 is provided with a circuit board 151 on which the imaging element 155 is mounted and the circuit board 151 is fixed to an under face of the imaging element holder 19.

The case 18 is made of a ferromagnetic plate such as a steel plate and functions as a yoke. Therefore, the case 18 structures an interlinkage magnetic field generating body together with lens drive magnets 17 described below for generating an interlinkage magnetic field in the lens drive coils 30*s* and 30*t*. The interlinkage magnetic field generating body structures the lens drive mechanism 5 together with the lens drive coils 30*s* and 30*t* which are wound around an outer peripheral face of the coil holder 13.

The support body 2 and the movable body 3 are connected with each other through metal spring members 14*s* and 14*t* which are disposed at separated positions in the optical axis "L" direction. Basic structures of the spring members 14*s* and 14*t* are similar to each other and each of the spring members 14*s* and 14*t* is provided with outer peripheral side connecting parts which are held by the support body 2, a ring-shaped inner peripheral side connecting part which is held by the movable body 3, and arm-shaped plate spring parts which connects the outer peripheral side connecting parts with the inner peripheral side connecting part. In the spring members 14*s* and 14*t*, the outer peripheral side connecting parts of the spring member 14*s* on the imaging element 155 side are held by the imaging element holder 19 and its inner peripheral side connecting part is connected with an imaging element side end part of the coil holder 13 of the movable body 3. The outer peripheral side connecting parts of the spring member 14*t* on the object side are held by the spacer 11 and its inner peripheral side connecting part is connected with an object side end part of the coil holder 13 of the movable body 3. In this manner, the movable body 3 is supported by the support body 2 through the spring members 14*s* and 14*t* so as to be movable in the direction of the optical axis "L". Each of the spring members 14*s* and 14*t* is made of nonmagnetic metal such as beryllium copper or nonmagnetic SUS steel material and is formed by performing press working or etching processing using a photo lithography technique on a thin plate having a certain thickness. In the spring members 14*s* and 14*t*, the spring member 14*s* is divided into two spring pieces and respective coil ends of the lens drive coils 30*s* and 30*t* are connected with the respective spring pieces. Further, two spring pieces of the spring member 14*s* are formed with a terminal and thus the spring member 14*s* functions as a power supply member for the lens drive coils 30*s* and 30*t*.

A ring-shaped magnetic piece 61 is held at an object side end part of the coil holder 13 and the magnetic piece 61 is held at a position on the object side with respect to the lens drive magnet 17. Therefore, the magnetic piece 61 applies an urging force in the direction of the optical axis "L" to the movable body 3 by an attraction force acted between the lens drive magnets 17 and the magnetic piece 61. Therefore, at a non-energization time (home position), the lens holder 12 is held stationary on the imaging element 155 side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30*s* and 30*t* can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis "L" direction, an attraction force is isotropically acted between the lens drive magnets 17 and the magnetic piece 61. In addition, at the time of energization to the lens drive coils 30*s* and 30*t*, the magnetic piece 61 is moved in a direction separated from the lens drive magnets 17 and thus an unnecessary force pressing the lens holder 12 to the imaging element 155 side may not act. Therefore, the lens holder 12 can be moved in the optical axis "L" direction with small electric power.

In the photographing unit 1 in this embodiment, the lens 10 (see FIG. 1) is formed in a circular shape when viewed in the direction of the optical axis "L" but the case 18 used as the support body 2 is formed in a rectangular box-like shape. Therefore, the case 18 is provided with a rectangular tube-shaped body part 18*c* and an upper plate part 18*b* formed with the incident window 18*a* is provided on the upper face side of the rectangular tube-shaped body part 18*c*. The lens drive magnets 17 are fixed to side face parts corresponding to the sides of a quadrangle of the rectangular tube-shaped body part 18*c* and the lens drive magnets 17 are respectively comprised of a rectangular flat plate-shaped permanent magnet. Each of four lens drive magnets 17 is divided into two pieces in the direction of the optical axis "L" and is magnetized so that a magnetic pole of its inner face and a magnetic pole of its outer face are different from each other.

In this embodiment, when the coil holder 13 is viewed in the direction of the optical axis "L", its inner peripheral shape is circular but an outer peripheral side face which determines an outer peripheral shape of the coil holder 13 is quadrangular and the lens drive coils 30*s* and 30*t* are wound around the coil holder 13. Each of the four lens drive magnets 17 is divided into two pieces in the optical axis "L" direction and is magnetized so that the magnetic pole of its inner face and the magnetic pole of its outer face are different from each other and thus winding directions of the two lens drive coils 30*s* and 30*t* are opposite to each other. The movable body 3 which is structured as described above is disposed on an inner side of the case 18. As a result, the lens drive coils 30*s* and 30*t* are oppositely disposed to the lens drive magnets 17 which are fixed to the inner face of the rectangular tube-shaped body part 18*c* of the case 18.

In the photographing unit 1 structured as described above, the movable body 3 is normally located on the imaging element side (one side in the "Z"-axis direction) and, in this state, when an electric current is supplied to the lens drive coils 30*s* and 30*t* in a predetermined direction, an electro-magnetic force directing the object side (the other side in the "Z"-axis direction) is applied to the respective lens drive coils 30*s* and 30*t*. Therefore, the movable body 3 to which the lens drive coils 30*s* and 30*t* are fixed begins to move to the object side (front side). In this case, an elastic force restricting movement of the movable body 3 is generated between the spring member 14*t* and the front end of the movable body 3 and between the spring member 14*s* and the rear end of the movable body 3. Accordingly, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30*s* and 30*t* is adjusted depending on the elastic force acting on the movable body 3 by the spring members 14*s* and 14*t*, the movable body 3 can be stopped at a desired position.

(Structure of Optical Unit 100)

Figure 3A:
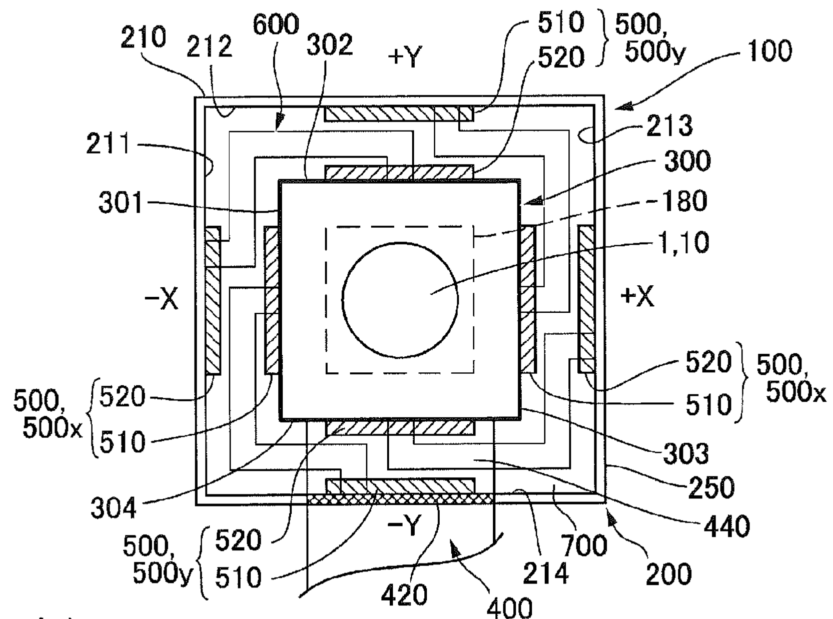
FIGS. 3(*a*), 3(*b*) and 3(*c*) are explanatory views schematically showing an internal structure of an optical unit with a shake correcting function in accordance with a first embodiment of the present invention.
Figure 3B:
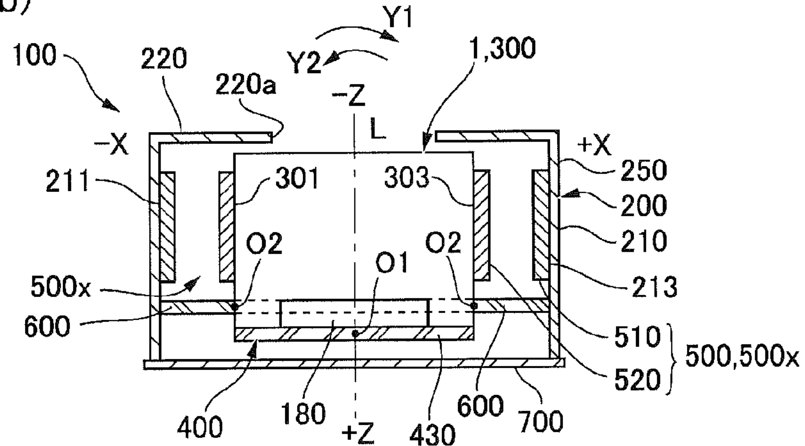
Figure 3C:
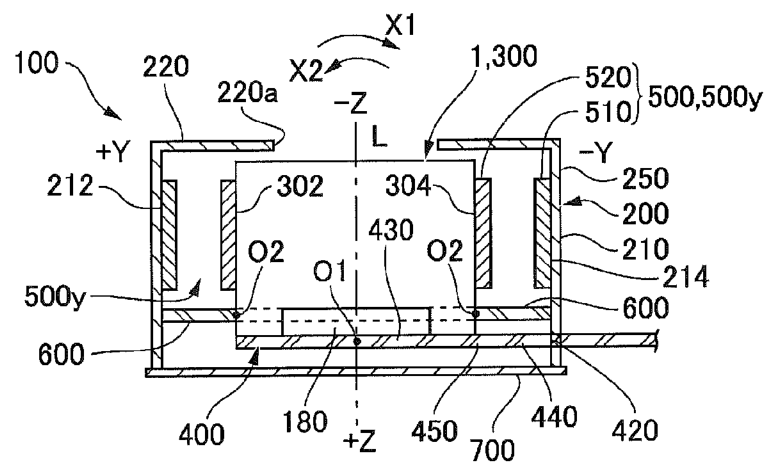

FIGS. 3(*a*), 3(*b*) and 3(*c*) are explanatory views schematically showing an internal structure of an optical unit with a shake correcting function in accordance with a first embodiment of the present invention. FIG. 3(*a*) is an explanatory plan view showing a structure of the optical unit, FIG. 3(*b*) is a cross-sectional view showing the optical unit whose center portion is cut along an "X-Z" plane, and FIG. 3(*c*) is a cross-sectional view showing the optical unit whose center portion is cut along a "Y-Z" plane. In FIG. 3(*a*), the movable module 300 is indicated by a thick solid line, the gyroscope 180 is indicated by a long broken line, the permanent magnet is indicated by slanted lines upward to the right, and the drive coil is indicated by slanted lines downward to the right.

In FIGS. 3(*a*), 3(*b*) and 3(*c*), the optical unit 100 includes a fixed body 200, a movable module 300 provided with the photographing unit 1, a spring member 600 through which the movable module 300 is supported by the fixed body 200 so as to be capable of displacing, the gyroscope 180 for detecting a shake of the movable module 300, and a movable module drive mechanism 500 which generates a magnetic drive force for relatively displacing the movable module 300 with respect to the fixed body 200 between the movable module 300 and the fixed body 200.

In this embodiment, the fixed body 200 is provided with an upper cover 250 and a lower cover 700 and the upper cover 250 is provided with a rectangular tube-shaped body part 210 which surrounds the movable module 300 and an end plate part 220 which closes an opening part on the object side of the rectangular tube-shaped body part 210. The end plate part 220 is formed with a window 220*a* through which light from an object to be photographed is incident. In the upper cover 250, an end part on the opposite side ("+Z" side) to the object side (side to which the optical axis is extended) of the rectangular tube-shaped body part 210 is formed to be opened. Further, the rectangular tube-shaped body part 210 is formed with a hole or a cut-out part for extending a flexible circuit board 400 to an outer side. The flexible circuit board 400 and the fixed body 200 are fixed to each other with an adhesive or the like in the vicinity of the hole or the cut-out part. In this embodiment, the gyroscope 180 is fixed to a substantially center portion of an end part on an opposite side to the object side of the movable module 300.

(Detail Structure of Spring Member 600)

Figure 4:
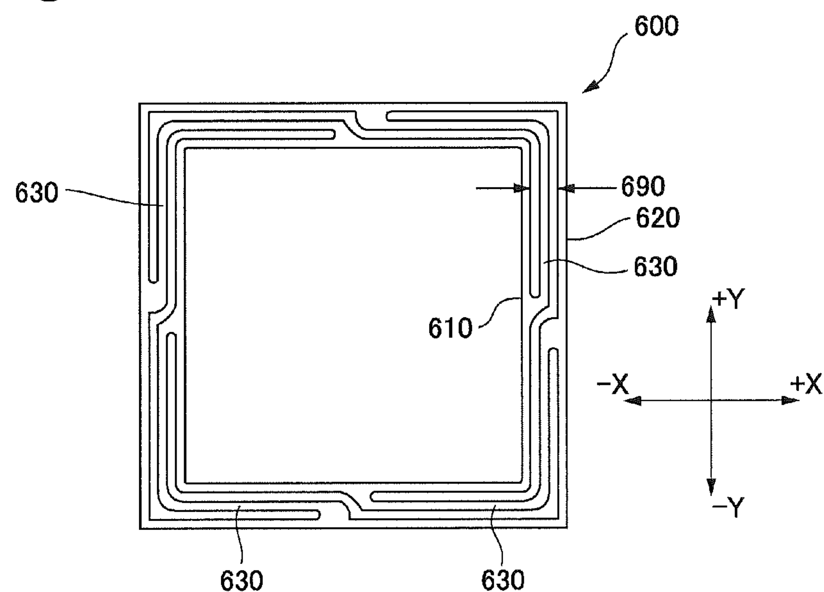
FIG. 4 is a plan view showing a spring member which is used in the optical unit with a shake correcting function in accordance with the first embodiment of the present invention.

FIG. 4 is a plan view showing a spring member which is used in the optical unit with a shake correcting function in accordance with the first embodiment of the present invention. As shown in FIGS. 3(*a*), 3(*b*) and 3(*c*) and FIG. 4, the spring member 600 is a plate-shaped spring member which is provided with a movable side connecting part 610 connected with the movable module 300, a fixed side connecting part 620 connected with the fixed body 200, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the movable side connecting part 610 of the spring member 600 is connected on a rear end side of the movable module 300. The spring member 600 is made of nonmagnetic metal such as beryllium copper or nonmagnetic SUS steel material and is formed by performing press working or etching processing using a photo lithography technique on a thin plate having a certain thickness.

(Detail Structure of Movable Module Drive Mechanism 500)

In FIGS. 3(*a*), 3(*b*) and 3(*c*), the movable module drive mechanism 500 is provided with drive coils 510 described below and permanent magnets 520 for generating magnetic fields interlinking with the drive coils 510. The permanent magnet 520 is fixed to four side faces 301, 302, 303 and 304 of the movable module 300 and the drive coil 510 is fixed to inner faces 211, 212, 213 and 214 of the rectangular tube-shaped body part 210 of the upper cover 250. The permanent magnet 520 is magnetized so that a pole on its outer face side is different from a pole on its inner face side. Further, the drive coil 510 is an air-core coil which is wound around in a quadrangular frame shape and upper and lower side portions of the drive coil 510 are utilized as an effective side.

In the permanent magnets 520 and the drive coils 510, the permanent magnets 520 and the drive coils 510 disposed at two positions so as to interpose the movable module 300 on both sides in the "X"-axis direction structure an "X"-side movable module drive mechanism 500*x* and, as shown by the arrows "Y1" and "Y2" in FIG. 3(*b*), the "X"-side movable module drive mechanism 500*x* swings the movable module 300 around the "Y"-axis with a swing center "O1" as a turning center. Further, the permanent magnets 520 and the drive coils 510 disposed at two positions so as to interpose the movable module 300 on both sides in the "Y"-axis direction structure an "Y"-side movable module drive mechanism 500*y* and, as shown by the arrows "X1" and "X2" in FIG. 3(*c*), the "Y"-side movable module drive mechanism 500*x* swings the movable module 300 around the "X"-axis with the swing center "O1" as a turning center.

(Operation of Shake Correction)

In the optical unit 100 in this embodiment, the optical device 1000 shown in FIG. 1 is shaken to cause the optical unit 100 to shake, the shake is detected by the gyroscope 180 and the detection of the gyroscope 180 is outputted to the host control section (not shown) through the flexible circuit board 400 shown in FIG. 1. The host control section controls the movable module drive mechanism 500 based on the detection of the gyroscope 180. In other words, a driving current for cancelling the shake detected by the gyroscope 180 is supplied to the drive coil 510 through the flexible circuit board 400. As a result, the "X"-side movable module drive mechanism 500*x* swings the movable module 300 around the "Y"-axis with the swing center "O1" as a turning center. Further, the "Y"-side movable module drive mechanism 500*y* swings the movable module 300 around the "X"-axis with the swing center "O1" as a turning center. Further, when the swing of the movable module 300 around the "X"-axis and the swing around the "Y"-axis are combined with each other, the movable module 300 can be displaced over the entire "X-Y" plane. Therefore, all shakes occurred in the optical unit 100 can be corrected surely.

(Structure of Flexible Circuit Board 400)

In this embodiment, the flexible circuit board 400 is provided with a movable side connecting part 430 which is connected with the movable module 300, and a belt-shaped extended part 440 which is extended in the "Y"-axis direction from the movable side connecting part 430. In this embodiment, a thickness direction of the extended part 440 is directed in the optical axis direction "L". Further, the flexible circuit board 400 is provided with a fixed side connecting part 420 which is connected with the fixed body 200 on an opposite side to a side where the movable side connecting part 430 is located with respect to the extended part 440.

In the flexible circuit board 400 having a structure as described above, the fixed side connecting part 420 is fixed to the fixed body 200 by a method such as adhesion and thus the fixed side connecting part 420 is not displaced when the movable module 300 is swung. On the other hand, the movable side connecting part 430 is adhesively bonded to the entire rear end face of the movable module 300 and, when the movable module 300 is swung, the movable side connecting part 430 is integrally displaced together with the movable module 300. In this case, a connecting portion 450 corresponding to a boundary portion between the movable side connecting part 430 and the extended part 440 is also integrally displaced together with the movable module 300 and thus the extended part 440 is deformed by the displacement.

The connecting portion 450 of the movable side connecting part 430 with the extended part 440 is disposed on the rear side in the optical axis direction "L" with respect to the support center position "O2" of the spring member 600 for the movable module 300, in other words, the connecting portion 450 is disposed at the position where the swing center "O1" of the movable module 300 is located. In this embodiment, since the spring member 600 is comprised of one piece, the support center position "O2" of the spring member 600 for the movable module 300 corresponds to a connected portion where the spring member 600 and the movable module 300 are connected with each other.

(Rigidity of Flexible Circuit Board 400)

Figure 5:
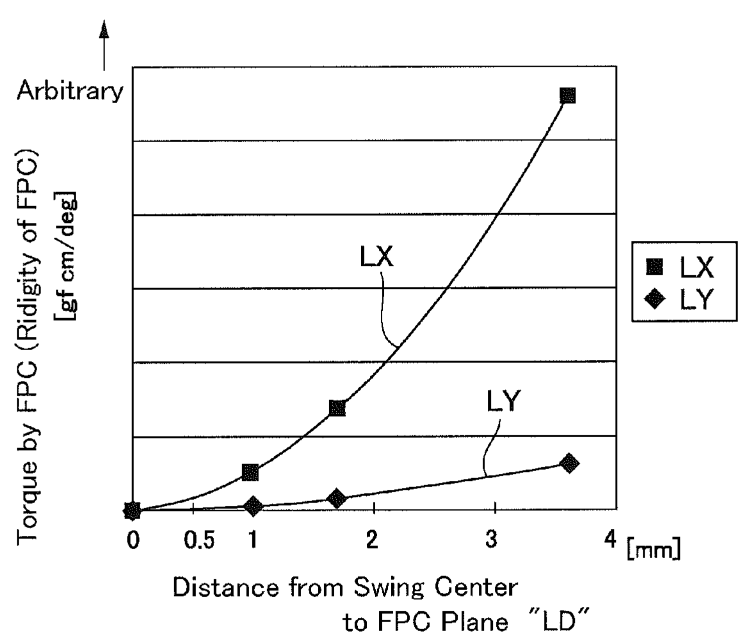
FIG. 5 is a graph showing a relationship between a distance in an optical axis direction of a flexible circuit board from a swing center shown in FIGS. 3(*b*) and 3(*c*) and the rigidity of a flexible circuit board.

FIG. 5 is a graph showing a relationship between a distance "LD" in the optical axis direction "L" of the flexible circuit board 400 (FPC) from the swing center "O1" shown in FIGS. 3(*b*) and 3(*c*) and the rigidity of the flexible circuit board 400. In FIG. 5, when the movable module is swung around the "X"-axis as shown in FIG. 3(*b*), a state where the rigidity of the flexible circuit board 400 is varied is shown by the solid line "LX" in a case that the distance "LD" in the optical axis direction "L" of the flexible circuit board 400 from the swing center "O1" is changed. Further, in FIG. 5, when the movable module is swung around the "Y"-axis as shown in FIG. 3(*c*), a state where the rigidity of the flexible circuit board 400 is varied is shown by the solid line "LY" in a case that the distance "LD" in the optical axis direction "L" of the flexible circuit board 400 from the swing center "O1" is changed.

The rigidity of the flexible circuit board 400 corresponds to a repulsive force of the extended part 440 which follows to be deformed when the movable module 300 is swung and a repulsive force which is applied from the fixed side connecting part 420 when the extended part 440 follows to be deformed.

As shown in FIG. 3(*c*), when the movable module 300 is swung around the "X"-axis, as shown by the solid line "LX" in FIG. 5, as the distance "LD" in the optical axis direction "L" between the flexible circuit board 400 and the swing center "O1" becomes larger, the rigidity of the extended part 440 of the flexible circuit board 400 is increased. In this case, when the movable module 300 is swung around the "X"-axis, the extended part 440 of the flexible circuit board 400 is deformed in a pulling direction or a pressing direction and thus the level of the rigidity is large. Further, when the movable module 300 is swung around the "X"-axis, in a case that the distance "LD" in the optical axis direction "L" of the flexible circuit board 400 from the swing center "O1" is not more than 0.5 mm, the rigidity of the flexible circuit board 400 is small but, in a case that the distance "LD" exceeds 0.5 mm, the rigidity of the flexible circuit board 400 is rapidly increased.

Further, when the movable module 300 is swung around the "Y"-axis as shown in FIG. 3(*b*), similarly to the case that the movable module 300 is swung around the "X"-axis, as shown by the solid line "LY" in FIG. 5, as the distance "Ld" in the optical axis direction "L" of the flexible circuit board 400 from the swing center "O1" becomes larger, the rigidity of the extended part 440 of the flexible circuit board 400 is increased. However, the extended part 440 of the flexible circuit board 400 is not deformed in a pulling direction or a pressing direction and thus a variation amount of the rigidity of the flexible circuit board 400 with respect to a distance in the optical axis direction "L" of the flexible circuit board 400 from the swing center "O1" is smaller than a case that the movable module 300 is swung around the "X"-axis.

As a result, in this embodiment, the swing center "O1" is set at a position less than ±0.5 mm in the optical axis direction "L" from at least one of the connecting portion 450 and the fixed side connecting part 420.

In this embodiment, the swing center "O1", the connecting portion 450 and the fixed side connecting part 420 are set at the same position in the optical axis direction "L". Therefore, the swing center "O1" is located at the position of ±0 mm in the optical axis direction "L" from both of the connecting portion 450 and the fixed side connecting part 420.

(Principal Effects in this Embodiment)

As described above, in the optical unit 100 with a shake correcting function in this embodiment, the flexible circuit board 400 is used as a wiring member which electrically connects the movable module 300 with the outer side and the rigidity of the flexible circuit board 400 is low in comparison with a cable and its repulsive force (shape returning force) when having been deformed is small. Therefore, the wiring member is restrained from disturbing the swing of the movable module.

Further, in the flexible circuit board 400, the connecting portion 450 of the movable side connecting part 430 with the extended part 440 is disposed on the rear side in the optical axis direction "L" with respect to the support center position "O2" of the spring member 600 for the movable module 300, in other words, the connecting portion 450 is disposed at the position where the swing center "O1" of the movable module 300 is located. Therefore, the connecting portion 450 is located in the vicinity of the swing center "O1" of the movable module 300. Therefore, when the movable module 300 is swung, a displacement amount of the flexible circuit board 400 is small. Accordingly, even when the flexible circuit board 400 is extended from the movable module 300, the swing of the movable module 300 is restrained from being disturbed by the rigidity of the flexible circuit board 400 and by the repulsive force generated when the flexible circuit board 400 is deformed.

Further, the swing center "O1", the connecting portion 450 and the fixed side connecting part 420 are located at the same position in the optical axis direction "L", or the swing center "O1" is located at a position of less than ±0.5 mm in the optical axis direction "L" from at least one of the connecting portion 450 and the fixed side connecting part 420. Therefore, a displacement amount of the flexible circuit board 400 is small when the movable module 300 is swung. Accordingly, even when the flexible circuit board 400 is extended from the movable module 300, the rigidity of the flexible circuit board 400 and the repulsive force generated when the flexible circuit board 400 has been deformed are prevented from disturbing the swing of the movable module 300.

In addition, a thickness direction of the extended part 440 of the flexible circuit board 400 is directed in the optical axis direction "L". Therefore, the rigidity when the movable module 300 is swung and the flexible circuit board 400 is displaced is small. Accordingly, the rigidity of the flexible circuit board 400 and the repulsive force generated when the flexible circuit board 400 is deformed is prevented from disturbing the swing of the movable module 300.

Second Embodiment

Figure 6A:
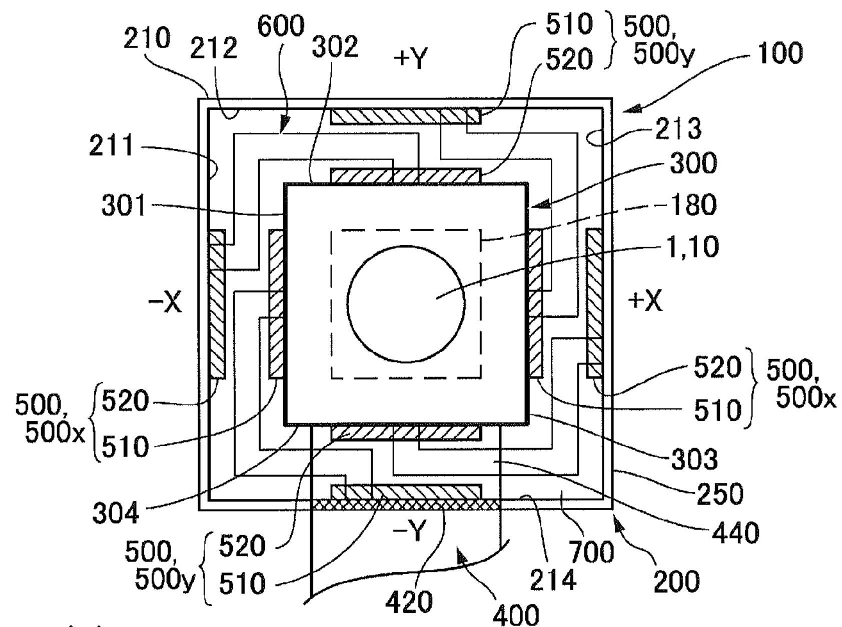
FIGS. 6(*a*), 6(*b*) and 6(*c*) are explanatory views schematically showing an internal structure of an optical unit with a shake correcting function in accordance with a second embodiment of the present invention.
Figure 6B:
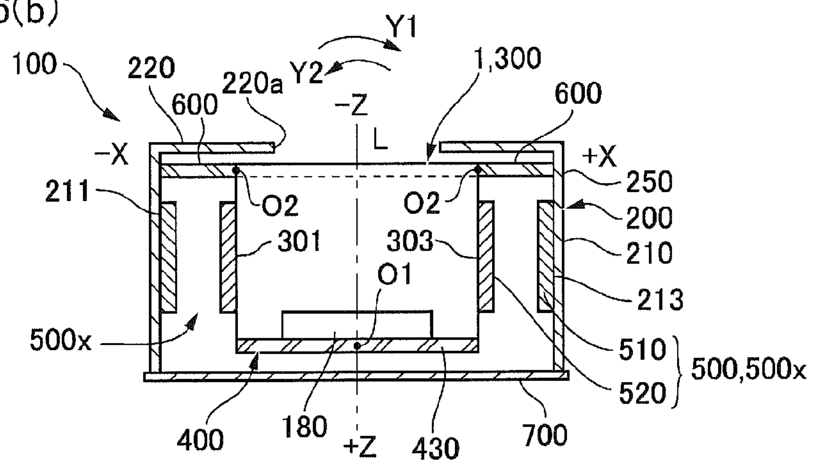
Figure 6C:
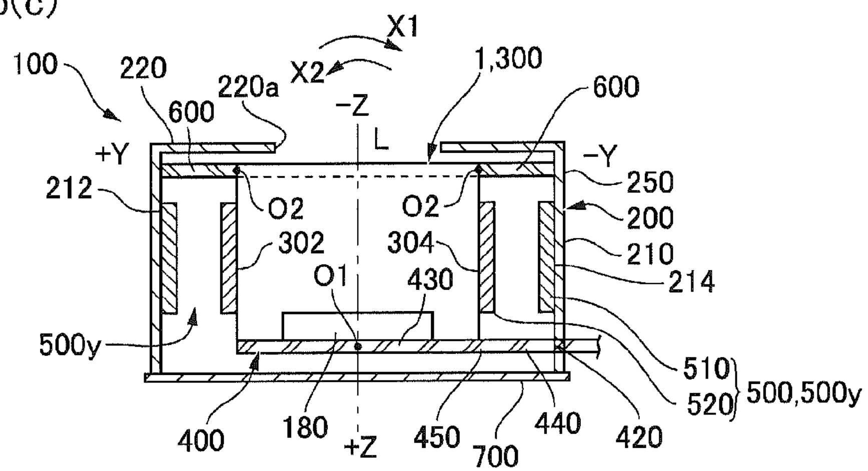

FIGS. 6(*a*), 6(*b*) and 6(*c*) are explanatory views schematically showing an internal structure of an optical unit with a shake correcting function in accordance with a second embodiment of the present invention. FIG. 6(*a*) is an explanatory plan view showing a structure of the optical unit, FIG. 6(*b*) is a cross-sectional view showing the optical unit whose center portion is cut along an "X-Z" plane, and FIG. 6(*c*) is a cross-sectional view showing the optical unit whose center portion is cut along a "Y-Z" plane. The basic structure in this embodiment is similar to the first embodiment and thus the same reference signs are used in common portions and their descriptions are omitted.

In FIGS. 6(*a*), 6(*b*) and 6(*c*), the optical unit 100 in this embodiment also includes, similarly to the first embodiment, a fixed body 200, a movable module 300 provided with the photographing unit 1, a spring member 600 through which the movable module 300 is supported by the fixed body 200 so as to be capable of displacing, a gyroscope 180 for detecting a shake of the movable module 300, and a movable module drive mechanism 500 which generates a magnetic drive force for relatively displacing the movable module 300 with respect to the fixed body 200 between the movable module 300 and the fixed body 200.

In this embodiment, the spring member 600 is connected with an end part on the front side of the movable module 300. Further, also in this embodiment, similarly to the first embodiment, a flexible circuit board 400 is connected with the end part on the rear side of the movable module 300.

Also in this embodiment, similarly to the first embodiment, the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L". Further, the flexible circuit board 400 is provided with a fixed side connecting part 420 which is connected with the fixed body 200 on an opposite side to a side where the movable side connecting part 430 is located with respect to the extended part 440.

In the flexible circuit board 400 having the structure as described above, the connecting portion 450 of the movable side connecting part 430 with the extended part 440 is disposed on the rear side in the optical axis direction "L" with respect to the support center position "O2" of the spring member 600 for the movable module 300, in other words, the connecting portion 450 is disposed at the position where the swing center "O1" of the movable module 300 is located. In this embodiment, since the spring member 600 is comprised of one piece, the support center position "O2" of the spring member 600 for the movable module 300 corresponds to a connected portion where the spring member 600 and the movable module 300 are connected with each other.

Further, the swing center "O1" is located at a position of less than ±0.5 mm in the optical axis direction "L" from at least one of the connecting portion 450 and the fixed side connecting part 420. In this embodiment, the swing center "O1", the connecting portion 450 and the fixed side connecting part 420 are set at the same position in the optical axis direction "L". Therefore, the swing center "O1" is located at the position of ±0 mm in the optical axis direction "L" from both of the connecting portion 450 and the fixed side connecting part 420.

Also in the optical unit 100 structured as described above, similarly to the first embodiment, when the movable module 300 is swung, a displacement amount of the flexible circuit board 400 is small. Therefore, similar effects to the first embodiment are attained, for example, even when the flexible circuit board 400 is extended from the movable module 300, the swing of the movable module 300 is restrained from being disturbed by the rigidity of the flexible circuit board 400 and by the repulsive force generated when the flexible circuit board 400 has been deformed.

Third Embodiment

Figure 7A:
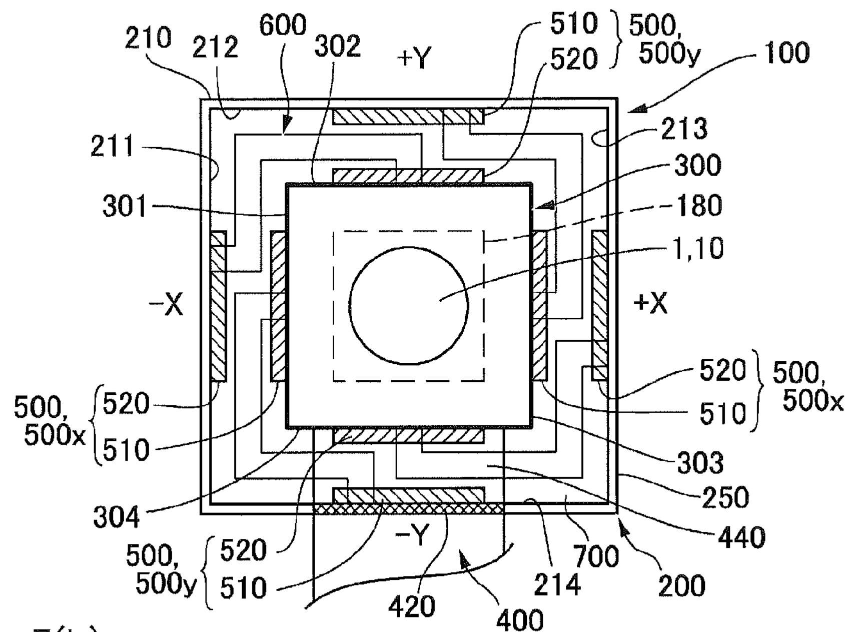
FIGS. 7(*a*), 7(*b*) and 7(*c*) are explanatory views schematically showing an internal structure of an optical unit with a shake correcting function in accordance with a third embodiment of the present invention.
Figure 7B:
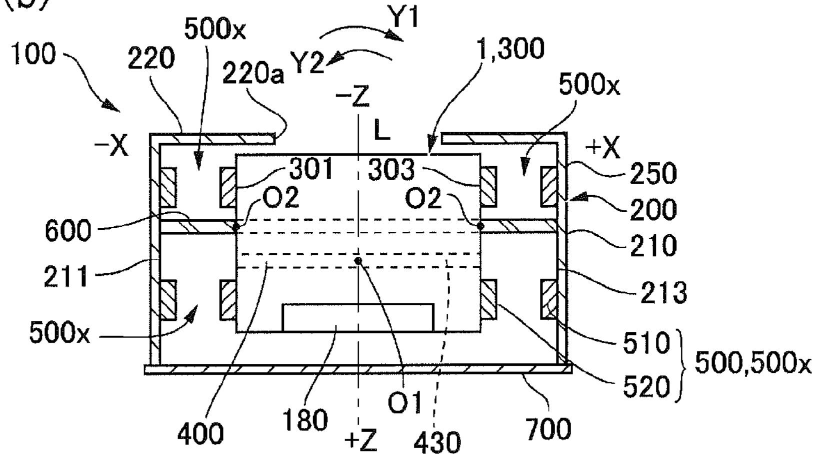
Figure 7C:
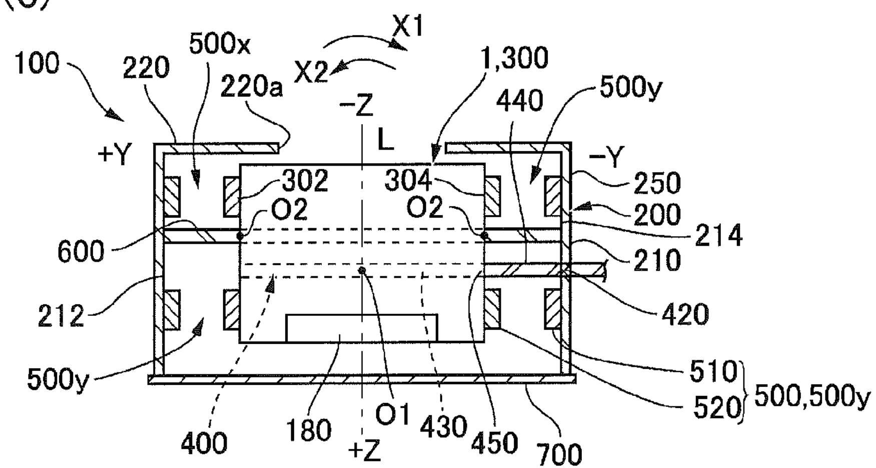

FIGS. 7(*a*), 7(*b*) and 7(*c*) are explanatory views schematically showing an internal structure of an optical unit with a shake correcting function in accordance with a third embodiment of the present invention. FIG. 7(*a*) is an explanatory plan view showing a structure of the optical unit, FIG. 7(*b*) is a cross-sectional view showing the optical unit whose center portion is cut along an "X-Z" plane, and FIG. 7(*c*) is a cross-sectional view showing the optical unit whose center portion is cut along a "Y-Z" plane. The basic structure in this embodiment is similar to the first embodiment and thus the same reference signs are used in common portions and their descriptions are omitted.

In FIGS. 7(*a*), 7(*b*) and 7(*c*), the optical unit 100 in this embodiment also includes, similarly to the first embodiment, a fixed body 200, a movable module 300 provided with the photographing unit 1, a spring member 600 through which the movable module 300 is supported by the fixed body 200 so as to be capable of displacing, a gyroscope 180 for detecting a shake of the movable module 300, and a movable module drive mechanism 500 which generates a magnetic drive force for relatively displacing the movable module 300 with respect to the fixed body 200 between the movable module 300 and the fixed body 200.

In this embodiment, the spring member 600 is connected with the movable module 300 at its intermediate position in the optical axis direction "L". Further, the flexible circuit board 400 is also connected with the movable module 300 at its intermediate position in the optical axis direction "L". In this embodiment, the flexible circuit board 400 is connected with the movable module 300 on the rear side with respect to the spring member 600.

Also in this embodiment, similarly to the first embodiment, the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L". Further, the flexible circuit board 400 is provided with a fixed side connecting part 420 which is connected with the fixed body 200 on an opposite side to a side where the movable side connecting part 430 is located with respect to the extended part 440.

In the flexible circuit board 400 having the structure as described above, the connecting portion 450 of the movable side connecting part 430 with the extended part 440 is disposed on the rear side in the optical axis direction "L" with respect to the support center position "O2" of the spring member 600 for the movable module 300 and, in addition, the connecting portion 450 is disposed at the position where the swing center "O1" of the movable module 300 is located. In this embodiment, since the spring member 600 is comprised of one piece, the support center position "O2" of the spring member 600 for the movable module 300 corresponds to a connected portion where the spring member 600 and the movable module 300 are connected with each other.

Further, the swing center "O1" is set at a position of less than ±0.5 mm in the optical axis direction "L" from at least one of the connecting portion 450 and the fixed side connecting part 420. In this embodiment, the swing center "O1", the connecting portion 450 and the fixed side connecting part 420 are set at the same position in the optical axis direction "L". Therefore, the swing center "O1" is located at the position of ±0 mm in the optical axis direction "L" from both of the connecting portion 450 and the fixed side connecting part 420.

Also in the optical unit 100 structured as described above, similarly to the first embodiment, when the movable module 300 is swung, a displacement amount of the flexible circuit board 400 is small. Therefore, similar effects to the first embodiment are attained, for example, even when the flexible circuit board 400 is extended from the movable module 300, the swing of the movable module 300 is restrained from being disturbed by the rigidity of the flexible circuit board 400 and by the repulsive force generated when the flexible circuit board 400 has been deformed.

Fourth Embodiment

Figure 8A:
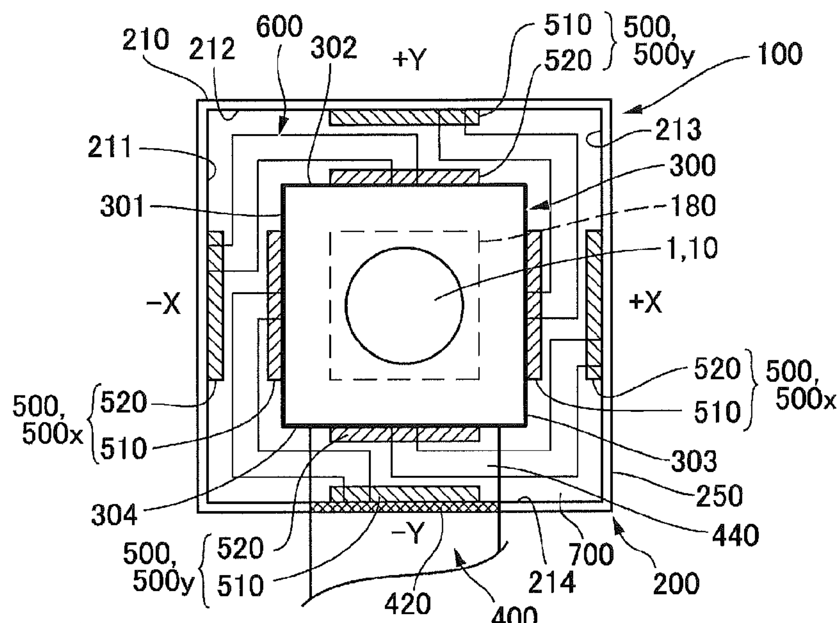
FIGS. 8(*a*), 8(*b*) and 8(*c*) are explanatory views schematically showing an internal structure of an optical unit with a shake correcting function in accordance with a fourth embodiment of the present invention.
Figure 8B:
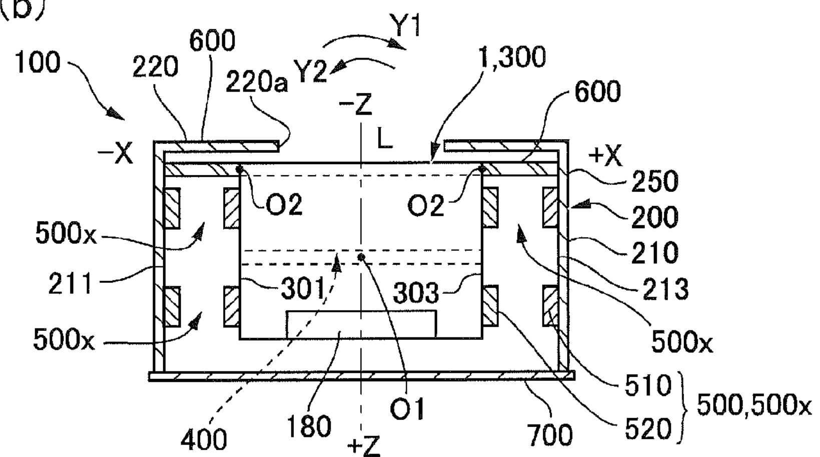
Figure 8C:
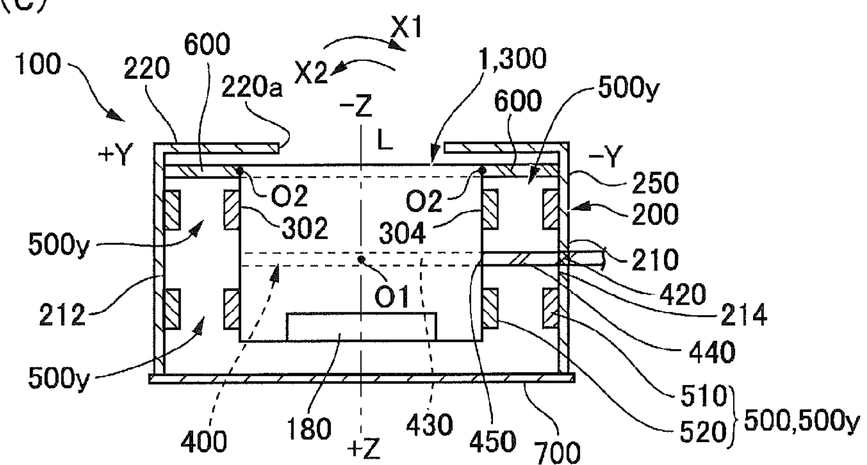

FIGS. 8(*a*), 8(*b*) and 8(*c*) are explanatory views schematically showing an internal structure of an optical unit with a shake correcting function in accordance with a fourth embodiment of the present invention. FIG. 8(*a*) is an explanatory plan view showing a structure of the optical unit, FIG. 8(*b*) is a cross-sectional view showing the optical unit whose center portion is cut along an "X-Z" plane, and FIG. 8(*c*) is a cross-sectional view showing the optical unit whose center portion is cut along a "Y-Z" plane. The basic structure in this embodiment is similar to the first embodiment and thus the same reference signs are used in common portions and their descriptions are omitted.

In FIGS. 8(*a*), 8(*b*) and 8(*c*), the optical unit 100 in this embodiment also includes, similarly to the first embodiment, a fixed body 200, a movable module 300 provided with the photographing unit 1, a spring member 600 through which the movable module 300 is supported by the fixed body 200 so as to be capable of displacing, a gyroscope 180 for detecting a shake of the movable module 300, and a movable module drive mechanism 500 which generates a magnetic drive force for relatively displacing the movable module 300 with respect to the fixed body 200 between the movable module 300 and the fixed body 200.

In this embodiment, the spring member 600 is connected with an end part on the front side of the movable module 300. Further, the flexible circuit board 400 is connected with the movable module 300 at its intermediate position in the optical axis direction "L".

Also in this embodiment, similarly to the first embodiment, the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L". Further, the flexible circuit board 400 is provided with a fixed side connecting part 420 which is connected with the fixed body 200 on an opposite side to a side where the movable side connecting part 430 is located with respect to the extended part 440.

In the flexible circuit board 400 having the structure as described above, the connecting portion 450 of the movable side connecting part 430 with the extended part 440 is disposed on the rear side in the optical axis direction "L" with respect to the support center position "O2" of the spring member 600 for the movable module 300 and, in addition, the connecting portion 450 is disposed at the position where the swing center "O1" of the movable module 300 is located. In this embodiment, since the spring member 600 is comprised of one piece, the support center position "O2" of the spring member 600 for the movable module 300 corresponds to a connected portion where the spring member 600 and the movable module 300 are connected with each other.

Further, the swing center "O1" is set at a position of less than ±0.5 mm in the optical axis direction "L" from at least one of the connecting portion 450 and the fixed side connecting part 420. In this embodiment, the swing center "O1", the connecting portion 450 and the fixed side connecting part 420 are set at the same position in the optical axis direction "L".

Therefore, the swing center "O1" is located at the position of ±0 mm in the optical axis direction "L" from both of the connecting portion 450 and the fixed side connecting part 420.

Also in the optical unit 100 structured as described above, similarly to the first embodiment, when the movable module 300 is swung, a displacement amount of the flexible circuit board 400 is small. Therefore, similar effects to the first embodiment are attained, for example, even when the flexible circuit board 400 is extended from the movable module 300, the swing of the movable module 300 is restrained from being disturbed by the rigidity of the flexible circuit board 400 and by the repulsive force generated when the flexible circuit board 400 has been deformed.

Fifth Embodiment

Figure 9A:
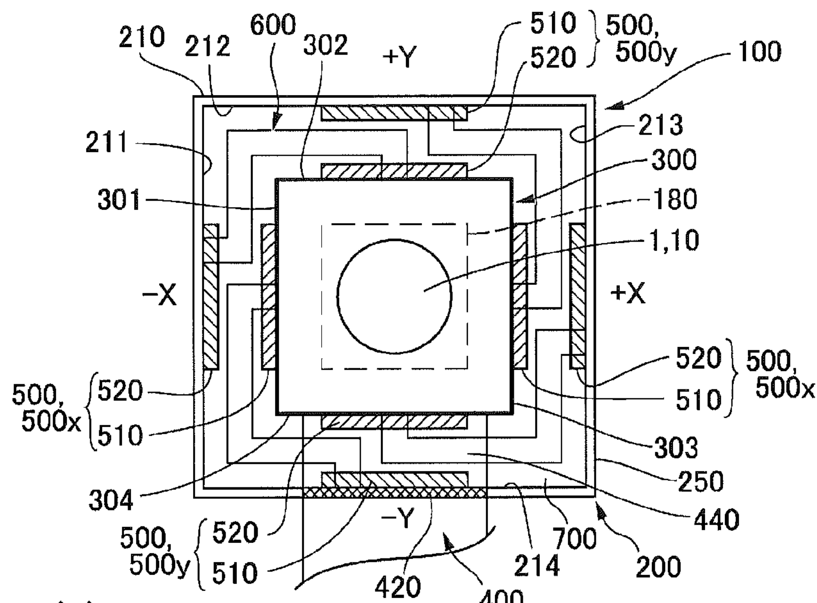
FIGS. 9(*a*), 9(*b*) and 9(*c*) are explanatory views schematically showing an internal structure of an optical unit with a shake correcting function in accordance with a fifth embodiment of the present invention.
Figure 9B:
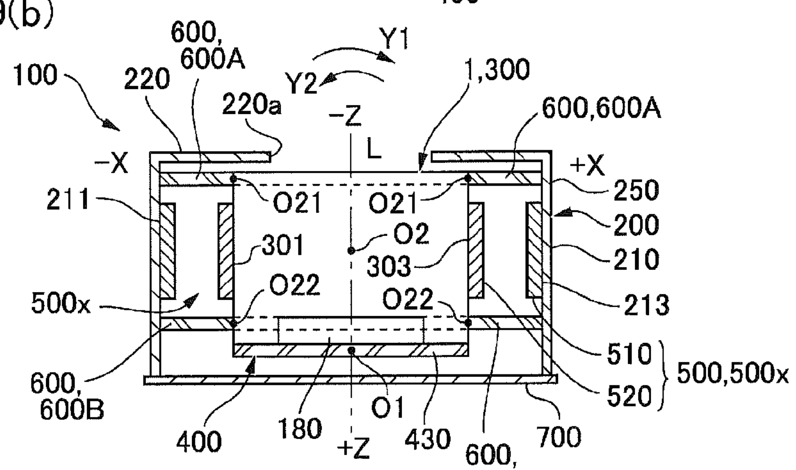
Figure 9C:
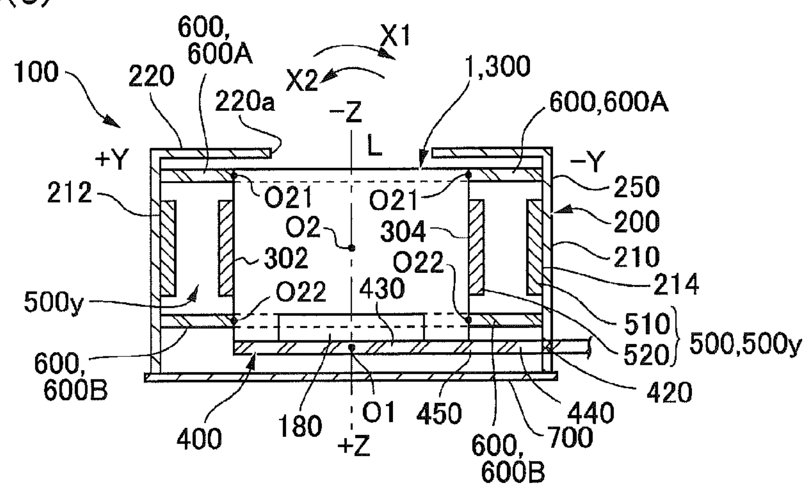

FIGS. 9(*a*), 9(*b*) and 9(*c*) are explanatory views schematically showing an internal structure of an optical unit with a shake correcting function in accordance with a fifth embodiment of the present invention. FIG. 9(*a*) is an explanatory plan view showing a structure of the optical unit, FIG. 9(*b*) is a cross-sectional view showing the optical unit whose center portion is cut along an "X-Z" plane, and FIG. 9(*c*) is a cross-sectional view showing the optical unit whose center portion is cut along a "Y-Z" plane. The basic structure in this embodiment is similar to the first embodiment and thus the same reference signs are used in common portions and their descriptions are omitted.

In FIGS. 9(*a*), 9(*b*) and 9(*c*), the optical unit 100 in this embodiment also includes, similarly to the first embodiment, a fixed body 200, a movable module 300 provided with the photographing unit 1, a spring member 600 through which the movable module 300 is supported by the fixed body 200 so as to be capable of displacing, a gyroscope 180 for detecting a shake of the movable module 300, and a movable module drive mechanism 500 which generates a magnetic drive force for relatively displacing the movable module 300 with respect to the fixed body 200 between the movable module 300 and the fixed body 200.

In this embodiment, the spring member 600 is connected with an end part on the front side of the movable module 300 as a first plate-shaped spring member 600A. Further, the spring member 600 is provided as a second plate-shaped spring member 600B at a position separated in the optical axis direction "L" from the first plate-shaped spring member 600A. In this embodiment, the second plate-shaped spring member 600B is connected with a slightly rear side of the movable module 300. Further, also in this embodiment, similarly to the first embodiment, the flexible circuit board 400 is connected with the end part on rear side of the movable module 300.

Also in this embodiment, similarly to the first embodiment, the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L". Further, the flexible circuit board 400 is provided with a fixed side connecting part 420 which is connected with the fixed body 200 on an opposite side to a side where the movable side connecting part 430 is located with respect to the extended part 440.

In the flexible circuit board 400 having the structure as described above, the connecting portion 450 of the movable side connecting part 430 with the extended part 440 is disposed on the rear side in the optical axis direction "L" with respect to the support center position "O2" of the spring member 600 for the movable module 300, in other words, the connecting portion 450 is disposed at the position where the swing center "O1" of the movable module 300 is located.

In this embodiment, since the spring member 600 is comprised of two pieces, the support center position "O2" of the spring member 600 for the movable module 300 is located at an intermediate position in the optical axis direction "L" between a portion "O21" where the first plate-shaped spring member 600A and the movable module 300 are connected with each other and a portion "O22" where the second plate-shaped spring member 600B and the movable module 300 are connected with each other.

Further, the swing center "O1" is located at a position of less than ±0.5 mm in the optical axis direction "L" from at least one of the connecting portion 450 and the fixed side connecting part 420. In this embodiment, the swing center "O1", the connecting portion 450 and the fixed side connecting part 420 are set at the same position in the optical axis direction "L". Therefore, the swing center "O1" is located at the position of ±0 mm in the optical axis direction "L" from both of the connecting portion 450 and the fixed side connecting part 420.

Also in the optical unit 100 structured as described above, similarly to the first embodiment, when the movable module 300 is swung, a displacement amount of the flexible circuit board 400 is small. Therefore, similar effects to the first embodiment are attained, for example, even when the flexible circuit board 400 is extended from the movable module 300, the swing of the movable module 300 is restrained from being disturbed by the rigidity of the flexible circuit board 400 and by the repulsive force generated when the flexible circuit board 400 has been deformed.

Sixth Embodiment

Figure 10A:
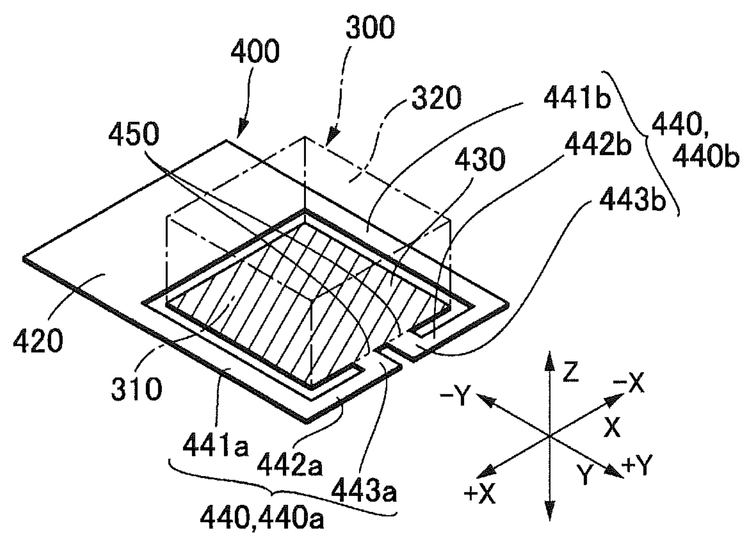
FIGS. 10(*a*) and 10(*b*) are explanatory views schematically showing a structure of a flexible circuit board which is used in an optical unit with a shake correcting function in accordance with a sixth embodiment of the present invention.
Figure 10B:
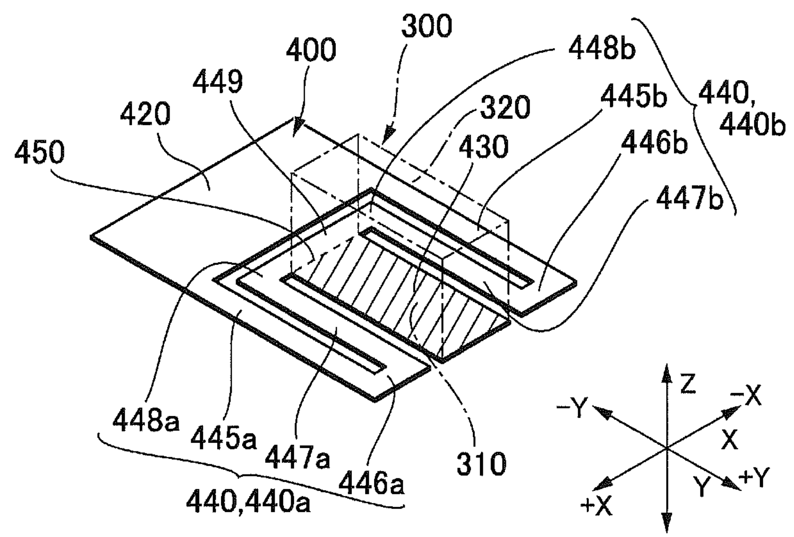

FIGS. 10(*a*) and 10(*b*) are explanatory views schematically showing a structure of a flexible circuit board 400 which is used in an optical unit with a shake correcting function in accordance with a sixth embodiment of the present invention. FIG. 10(*a*) is an explanatory view showing a flexible circuit board 400 in which one extended part is disposed on both sides so as to interpose the movable module 300, and FIG. 10(*b*) is an explanatory view showing a flexible circuit board 400 in which two extended parts are disposed on both sides so as to interpose the movable module 300. The basic structure in this embodiment is similar to the first embodiment and thus the same reference signs are used in common portions and their descriptions are omitted.

As shown in FIG. 10(*a*), the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L". Further, the flexible circuit board 400 is provided with a fixed side connecting part 420 which is connected with the fixed body (not shown) on an opposite side to a side where the movable side connecting part 430 is located with respect to the extended part 440.

In this embodiment, the extended part 440 is structured of a first extended part 440*a* and a second extended part 440*b* which are extended along a first side face 310 and a second side face 320 of the movable module 300 facing in the "X"-axis direction across the optical axis. The first extended part 440*a* and the second extended part 440*b* are provided with a linearly symmetric shape with the "Y"-axis as a center.

In this embodiment, the first extended part 440*a* is provided with a first direction extended part 441*a* in a belt shape which is extended from the fixed side connecting part 420 to one side in the "Y"-axis direction along the first side face 310, a second direction extended part 442*a* which is extended from a tip end part of the first direction extended part 441*a* to the other side in the "X"-axis direction, and a first direction extended part 443*a* which is extended from a tip end part of the second direction extended part 442*a* to the other side in the "Y"-axis direction to be connected with the movable side connecting part 430. A boundary portion between the first direction extended part 443*a* and the movable side connecting part 430 is a connecting portion 450.

Further, the second extended part 440*b* is provided with a first direction extended part 441*b* in a belt shape which is extended from the fixed side connecting part 420 to one side in the "Y"-axis direction along the second side face 320, a second direction extended part 442*b* which is extended from a tip end part of the first direction extended part 441*b* to one side in the "X"-axis direction, and a first direction extended part 443*b* which is extended from a tip end part of the second direction extended part 442*b* to the other side in the "Y"-axis direction to be connected with the movable side connecting part 430. A boundary portion between the first direction extended part 443*b* and the movable side connecting part 430 is a connecting portion 450.

According to the flexible circuit board 400 having the structure as described above, the first extended part 440*a* and the second extended part 440*b* are extended long and thus the rigidity is low. Therefore, in each of cases when the movable module 300 is swung around the "X"-axis and the movable module 300 is swung around the "Y"-axis, the flexible circuit board 400 follows the swing of the movable module 300 to be smoothly deformed. Accordingly, the movable module 300 can be swung with a high degree of accuracy.

Further, also in the flexible circuit board 400 shown in FIG. 10(*b*), the extended part 440 is structured of the first extended part 440*a* and the second extended part 440*b* which are extended along the first side face 310 and the second side face 320 of the movable module 300 facing in the "X"-axis direction across the optical axis. The first extended part 440*a* and the second extended part 440*b* are provided with a linearly symmetric shape with the "Y"-axis as a center.

In this embodiment, the first extended part 440*a* is provided with a first direction extended part 445*a* in a belt shape which is extended from the fixed side connecting part 420 to one side in the "Y"-axis direction along the first side face 310, a second direction extended part 446*a* which is extended from a tip end part of the first direction extended part 445*a* to the other side in the "X"-axis direction, a first direction extended part 447*a* which is extended along the first side face 310 from a tip end part of the second direction extended part 446*a* to the other side in the "Y"-axis direction, and a second direction extended part 448*a* which is extended from a tip end part of the first direction extended part 447*a* to the other side in the "X"-axis direction. The second direction extended part 448*a* is a connecting part 449 which is connected with the movable side connecting part 430.

Further, the second extended part 440*b* is provided with a first direction extended part 445*b* in a belt shape which is extended from the fixed side connecting part 420 to one side in the "Y"-axis direction along the second side face 320, a second direction extended part 446*b* which is extended from a tip end part of the first direction extended part 445*b* to one side in the "X"-axis direction, a first direction extended part 447*b* which is extended along the second side face 320 from a tip end part of the second direction extended part 446*b* to the other side in the "Y"-axis direction, and a second direction extended part 448*b* which is extended from a tip end part of the first direction extended part 447*b* to one side in the "X"-axis direction. The second direction extended part 448*b* is a connecting part 449. In the flexible circuit board 400 described above, a boundary portion between the common connecting part 449 and the movable side connecting part 430 is the connecting portion 450.

According to the flexible circuit board 400 having the structure as described above, the first extended part 440*a* and the second extended part 440*b* are extended long and thus the rigidity is low. Therefore, in each of cases when the movable module 300 is swung around the "X"-axis and the movable module 300 is swung around the "Y"-axis, the flexible circuit board 400 follows the swing of the movable module 300 to be smoothly deformed. Accordingly, the movable module 300 can be swung with a high degree of accuracy.

Seventh Embodiment

Figure 11A:
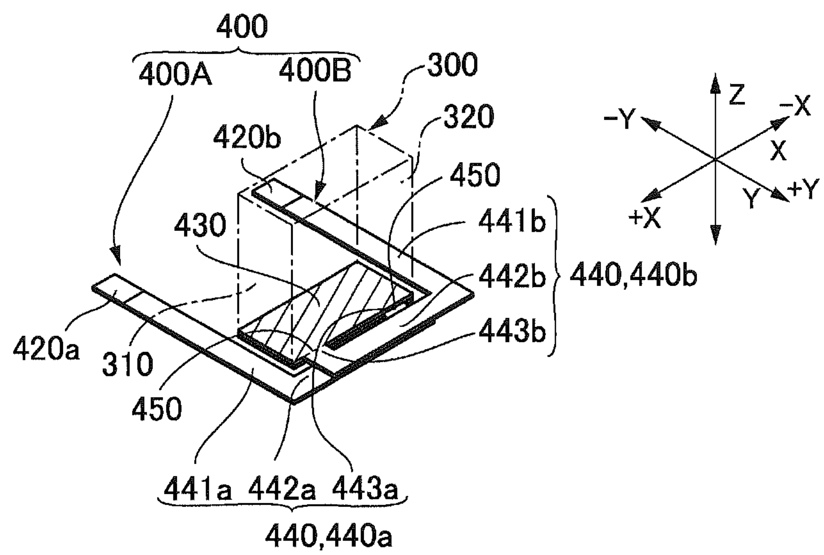
FIGS. 11(*a*) and 11(*b*) are explanatory views schematically showing a structure of a flexible circuit board which is used in an optical unit with a shake correcting function in accordance with a seventh embodiment of the present invention.
Figure 11B:
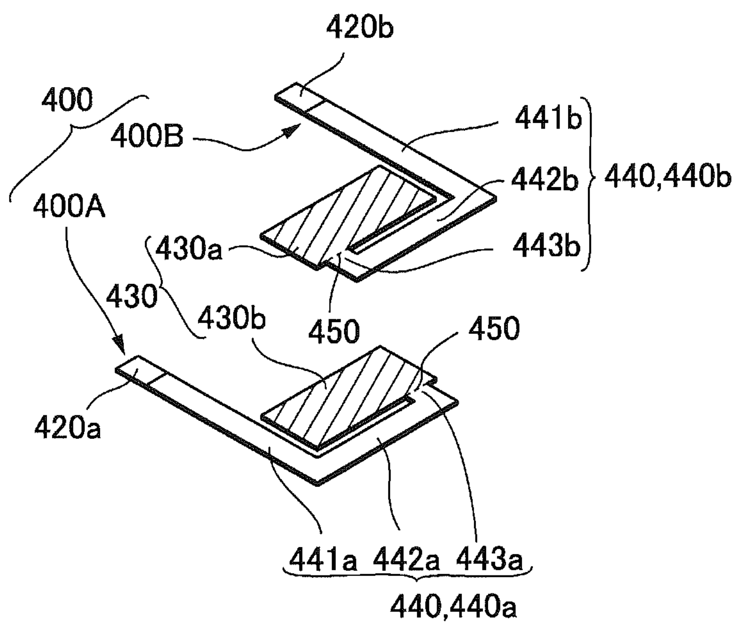

FIGS. 11(*a*) and 11(*b*) are explanatory views schematically showing a structure of a flexible circuit board 400 which is used in an optical unit with a shake correcting function in accordance with a seventh embodiment of the present invention. FIG. 11(*a*) is an explanatory view showing a state in which two flexible circuit boards are overlapped with each other, and FIG. 11(*b*) is an explanatory view showing a state in which two flexible circuit boards are disassembled. The basic structure in this embodiment is similar to the first embodiment and thus the same reference signs are used in common portions and their descriptions are omitted.

As shown in FIG. 11(*a*), the flexible circuit board 400 is provided with a movable side connecting part 430 which is connected with the movable module 300, and an extended part 440 which is extended from the movable side connecting part 430, and a thickness direction of the extended part 440 is directed in the optical axis direction "L".

In this embodiment, the extended part 440 is structured of a first extended part 440*a* and a second extended part 440*b* which are extended along a first side face 310 and a second side face 320 of the movable module 300 facing in the "X"-axis direction across the optical axis. The first extended part 440*a* and the second extended part 440*b* are provided with a linearly symmetric shape with the "Y"-axis as a center. Further, the flexible circuit board 400 is provided with fixed side connecting parts 420*a* and 420*b* connected with the fixed body (not shown) on an opposite side to a side where the movable side connecting part 430 is located with respect to the first extended part 440*a* and the second extended part 440*b*.

In this embodiment, the first extended part 440*a* is provided with a first direction extended part 441*a* in a belt shape which is extended to one side in the "Y"-axis direction along the first side face 310, a second direction extended part 442*a* which is extended from a tip end part of the first direction extended part 441*a* to the other side in the "X"-axis direction, and a first direction extended part 443*a* which is extended from a tip end part of the second direction extended part 442*a* to the other side in the "Y"-axis direction to be connected with the movable side connecting part 430. A boundary portion between the first direction extended part 443*a* and the movable side connecting part 430 is a connecting portion 450. Further, the second extended part 440*b* is provided with a first direction extended part 441*b* in a belt shape which is extended to one side in the "Y"-axis direction along the second side face 320, a second direction extended part 442*b* which is extended from a tip end part of the first direction extended part 441*b* to one side in the "X"-axis direction, and a first direction extended part 443*b* which is extended from a tip end part of the second direction extended part 442*b* to the other side in the "Y"-axis direction to be connected with the movable side connecting part 430. A boundary portion between the first direction extended part 443*b* and the movable side connecting part 430 is a connecting portion 450.

In order to structure the flexible circuit board 400 having the structure as described above, in this embodiment, two flexible circuit boards 400A and 400 B are used. The flexible circuit board 400A is provided with the first direction extended part 441*a*, the second direction extended part 442*a*, the first direction extended part 443*a* and the movable side connecting part 430*a*. Further, the flexible circuit board 400B is provided with the first direction extended part 441*b*, the second direction extended part 442*b*, the first direction extended part 443*b* and the movable side connecting part 430*b*. When the flexible circuit boards 400A and 400B are overlapped with each other, the movable side connecting parts 430*a* and 430*b* are superposed on each other to structure the movable side connecting part 430. In this embodiment, two flexible circuit boards 400A and 400B are partially electrically connected with each other and function as one piece of the flexible circuit board 400.

According to the flexible circuit board 400 having the structure as described above, the first extended part 440*a* and the second extended part 440*b* are extended long and thus the rigidity is low. Therefore, in each of cases when the movable module 300 is swung around the "X"-axis and the movable module 300 is swung around the "Y"-axis, the flexible circuit board 400 follows the swing of the movable module 300 to be smoothly deformed. Accordingly, the movable module 300 can be swung with a high degree of accuracy.

Other Embodiments

In the embodiments described above, the "X"-side movable module drive mechanism 500*x* and the "Y"-side movable module drive mechanism 500*y* are provided for the photographing unit 1. However, the present invention may be applied to an optical unit which is provided with only one of the "X"-side movable module drive mechanism 500*x* and the "Y"-side movable module drive mechanism 500*y* so that only a shake is corrected in a direction where a shake by the user is easily occurred.

In the embodiments described above, the present invention is, as an example, applied to the optical unit 100 which is used in a cell phone with a camera. However, the present invention may be applied to the optical unit 100 which is used in a thin digital camera or the like. Further, in the embodiments described above, the photographing unit 1 includes, as an example, in addition to the lens 10 and the imaging element 155, the lens drive mechanism 5 for magnetically driving the movable body 3 including the lens 10 in the optical axis "L" direction which is supported on the support body 2. However, the present invention may be applied to a fixed focus type optical unit in which the lens drive mechanism 5 is not mounted on the photographing unit 1.

In addition, other than a cell phone, a digital camera and the like, the optical unit 100 with a shake correcting function to which the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, when states of surroundings are photographed at a constant interval and the image is transmitted to a predetermined server, the parent or the like can observe the image at a remote place to secure security of the child. In this application, without conscious of a camera, a clear image is photographed even when vibration occurs at the time of moving. Further, when a GPS is mounted in addition to the camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in observation with high magnification such as an astronomical telescope system or a binocular system, the optical unit 100 may be used to observe without using an auxiliary locking device such as a three-legged support. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correcting function comprising:

a fixed body;

a movable module which holds an optical element;

a spring member which supports the movable module;

a movable module drive mechanism for shake correction for swinging the movable module with respect to the fixed body; and a flexible circuit board directly connected with the movable module, the flexible circuit board comprising a movable side connecting part connected with the movable module and an extended part extended from the movable side connecting part;

wherein a connecting portion of the movable side connecting part and the extended part is located on a side where a swing center of the movable module is located in an optical axis direction of the optical element with respect to a support center position of the spring member for the movable module;

wherein the spring member comprises:

a holding part which holds the movable module;

a fixing part which is fixed to the fixed body; and a spring part which connects the holding part with the fixing part;

wherein a first end of the spring part connects to the holding part at approximately a center of a side of the holding part, and a second end of the spring part connects to the fixing part at approximately a center of a is approximately perpendicular to the side of the holding part where the first end of the spring part is connected.

2. The optical unit with a shake correcting function according to claim 1, wherein the flexible circuit board is provided with a fixed side connecting part which is connected with the fixed body on an opposite side to a side where the movable side connecting part is located with respect to the extended part.

3. The optical unit with a shake correcting function according to claim 2, wherein the swing center is located at a position less than ±0.5 mm in the optical axis direction from at least one of the connecting portion and the fixed side connecting part.

4. The optical unit with a shake correcting function according to claim 3, wherein the swing center, the connecting portion and the fixed side connecting part are located at same position as each other in the optical axis direction.

5. The optical unit with a shake correcting function according to claim 3, wherein a thickness direction of the extended part is directed in the optical axis direction.

6. The optical unit with a shake correcting function according to claim 3, wherein the extended part of the flexible circuit board comprises:

a first extended part which is extended along a first side face of the movable module; and a second extended part which is extended along a second side face located on an opposite side to the first side face of the movable module across an optical axis of the optical element.

7. The optical unit with a shake correcting function according to claim 3, wherein the extended part comprises:

a first direction extended part extended in a first direction which is perpendicular to the optical axis direction; and a second direction extended part extended from the first direction extended part in a second direction which is perpendicular to the first direction extended part and the optical axis direction.

8. The optical unit with a shake correcting function according to claim 3, wherein the spring member is comprised of one plate-shaped spring member, and the support center position is a connecting position of the plate-shaped spring member with the movable module.

9. The optical unit with a shake correcting function according to claim 3, wherein the spring member is comprised of a first plate-shaped spring member and a second plate-shaped spring member which is disposed at a position separated from the first plate-like member in the optical axis direction, and the support center position is an intermediate position in the optical axis direction between a connecting position of the first plate-like member with the movable module and a connecting position of the second plate-like member with the movable module.

10. The optical unit with a shake correcting function according to claim 1, wherein the movable module includes a photographing unit having a lens as the optical element, the photographing unit is an optical element unit provided with a lens drive mechanism for moving the lens along the optical axis direction, a movable module drive mechanism is provided between the movable module and the fixed body for swinging so that a shake of the movable module is cancelled, energization to the movable module drive mechanism is performed through the flexible circuit board and the flexible circuit board is also connected with the photographing unit.

11. The optical unit with a shake correcting function according to claim 10, wherein the flexible circuit board is connected with a bottom face on an opposite side to an object to be photographed side of the movable module, and the swing center is located at a bottom part of the movable module.

12. The optical unit with a shake correcting function according to claim 11, wherein the movable module is accommodated into an inside of the fixed body through the spring member, and the extended part of the flexible circuit board is extended in a direction substantially perpendicular to the optical axis direction from the movable side connecting part and is provided with a fixed side connecting part which is connected with the fixed body.

13. The optical unit with a shake correcting function according to claim 12, wherein the swing center is located at a position less than ±0.5 mm in the optical axis direction from the connecting portion and the fixed side connecting part.

14. The optical unit with a shake correcting function according to claim 13, wherein the swing center, the connecting portion and the fixed side connecting part are located at same position as each other in the optical axis direction.

15. The optical unit with a shake correcting function according to claim 10, wherein the photographing unit includes a movable body which holds the lens on an inner side and a support body on which the lens drive mechanism and the movable body are mounted, the flexible circuit board is connected with a bottom face of the movable module within which the photographing unit is accommodated, and the swing center is located at a bottom part of the movable module.

16. The optical unit with a shake correcting function according to claim 15, wherein the spring member is a plate-shaped spring member which is provided with a movable side connecting part connected with the movable module, a fixed side connecting part connected with the fixed body, and a plurality of arm parts extended between the movable side connecting part and the fixed side connecting part, and the movable side connecting part of the spring member is connected on an object to be photographed side with respect to the swing center of the movable module.

17. The optical unit with a shake correcting function according to claim 16, wherein the spring member is comprised of one plate-shaped spring member, and the support center position is a connecting position of the plate-shaped spring member with the movable module.

* * * * *